(12) United States Patent
Liu et al.

(10) Patent No.: US 9,082,287 B2
(45) Date of Patent: Jul. 14, 2015

(54) METHODS FOR DISPLAYING AND DETERMINING MOVEMENT STATE OF MEMORY CARD SLOT, AND MEMORY CARD SLOT MOVEMENT STATE DISPLAYING AND DETERMINING SYSTEM

(71) Applicant: WISTRON CORP., New Taipei (TW)

(72) Inventors: Wei-Wei Liu, New Taipei (TW); Lily Yl Li, New Taipei (TW)

(73) Assignee: WISTRON CORP., New Taipei (TW)

( * ) Notice: Subject to any disclaimer, the term of this patent is extended or adjusted under 35 U.S.C. 154(b) by 135 days.

(21) Appl. No.: 14/011,755

(22) Filed: Aug. 28, 2013

(65) Prior Publication Data

US 2014/0070954 A1    Mar. 13, 2014

(30) Foreign Application Priority Data

Sep. 11, 2012    (CN) .......................... 2012 1 0335730

(51) Int. Cl.
*G08B 21/00* (2006.01)
*G08B 21/18* (2006.01)
*G06K 13/08* (2006.01)

(52) U.S. Cl.
CPC ............... *G08B 21/18* (2013.01); *G06K 13/08* (2013.01)

(58) Field of Classification Search
CPC .. G08B 21/18; G08B 13/1409; H01R 13/703; H01R 13/717
USPC .......... 340/687, 540, 686.1, 679; 439/1, 152, 439/218; 361/736, 737
See application file for complete search history.

(56) References Cited

U.S. PATENT DOCUMENTS

| | | | |
|---|---|---|---|
| 4,710,026 A * | 12/1987 | Magome et al. ............... | 356/488 |
| 4,874,941 A | 10/1989 | Spillman, Jr. | |
| 6,638,087 B1 * | 10/2003 | Takada et al. ................. | 439/188 |
| 6,839,431 B2 * | 1/2005 | Ooya et al. ............... | 379/433.09 |
| 6,942,507 B1 * | 9/2005 | Wu et al. ........................ | 439/159 |
| 7,229,300 B2 | 6/2007 | Lai et al. | |
| 7,393,221 B2 | 7/2008 | Feng et al. | |
| 8,500,471 B1 * | 8/2013 | Chan et al. ..................... | 439/159 |
| 8,814,582 B2 * | 8/2014 | Lee et al. ....................... | 439/159 |
| 2004/0015631 A1 * | 1/2004 | Kwong et al. ................ | 710/302 |
| 2012/0094514 A1 * | 4/2012 | Sun et al. ....................... | 439/159 |

FOREIGN PATENT DOCUMENTS

| | | |
|---|---|---|
| TW | M318256 | 9/2007 |
| TW | 200905569 A | 2/2009 |
| TW | M416241 | 11/2011 |
| TW | M434356 U | 7/2012 |

OTHER PUBLICATIONS

The office action of the corresponding Taiwanese application and its partial English translation.

* cited by examiner

*Primary Examiner* — Eric M Blount
(74) *Attorney, Agent, or Firm* — CKC & Partners Co., Ltd.

(57) ABSTRACT

A method for displaying the movement state of a memory card slot is disclosed. Detection is performed to determine whether a slot button has been touched for activating. A light intensity signal is received and transformed into an electrical signal when the slot button has been activated, in which the light intensity signal represents the movement of the memory card slot. Next, the electrical signal is processed through a processor for deriving a position of the memory card slot, and the movement state is displayed according to the position of the memory card slot.

20 Claims, 8 Drawing Sheets

US 9,082,287 B2

METHODS FOR DISPLAYING AND DETERMINING MOVEMENT STATE OF MEMORY CARD SLOT, AND MEMORY CARD SLOT MOVEMENT STATE DISPLAYING AND DETERMINING SYSTEM

RELATED APPLICATIONS

This application claims priority to Chinese Application Serial Number 201210335730.8, filed Sep. 11, 2012, which is herein incorporated by reference.

BACKGROUND

1. Field of Invention

The present invention relates to a memory card slot structure. More particularly, the present invention relates to a secure digital memory card slot structure.

2. Description of Related Art

Secure Digital (SD) cards, which are non-volatile memory cards, are widely used in electronic devices. Most computer devices have card slots for accommodating SD cards. More and more people favor SD cards due to their small size, large capacity, and good portability. However, during the manufacture of computer devices, repeated plugging in and out of SD cards causes buttons of the SD card slot to displace, such that the SD cards cannot be properly installed. Moreover, repeated plugging in and out of SD cards is burdensome on testers and may damage the SD cards.

SUMMARY

According to one embodiment of the present invention, a method for displaying a movement state of a memory card slot is disclosed. In the method, detection is performed to determine whether a slot button has been touched for activating. Next, a light intensity signal is received and transformed into an electrical signal when the slot button has been activated, in which the light intensity signal represents the movement of the memory card slot. Next, the electrical signal is processed through a processor for deriving a position of the memory card slot, and the movement state is displayed according to the position of the memory card slot.

According to another embodiment of the present invention, a method for determining a movement state of a memory card slot is disclosed. In the method, the memory card slot is moved, and the movement of the memory card slot is converted into a light intensity signal through an optical grating. Subsequently, the light intensity signal is converted into a periodic electrical signal, and the periodic electrical signal is shaped for producing a square wave signal. Next, the square wave signal is converted into a plurality of pulses, and the movement state of the memory card slot is derived according to a number of the pulses.

According to still another embodiment of the present invention, a memory card slot movement state displaying and determining system is disclosed. The system includes a memory card, a slot fixing base, a grating sensor, a transmission device, a processor, and a display. The memory card slot accommodates a memory card. The slot fixing base is connected to the memory card slot for holding the memory card slot. The grating sensor makes a light intensity signal change periodically through a movement of an optical grating, in which the light intensity signal is converted into an electrical signal by a photovoltaic element. The transmission device connects to and moves the slot fixing base, in which the grating sensor communicates with the slot fixing base through the transmission device. The processor processes the electrical signal to produce a card slot position signal. The display displays a movement state of the memory card slot according to the card slot position signal.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figures 1A, 1B, 1C, 1D:
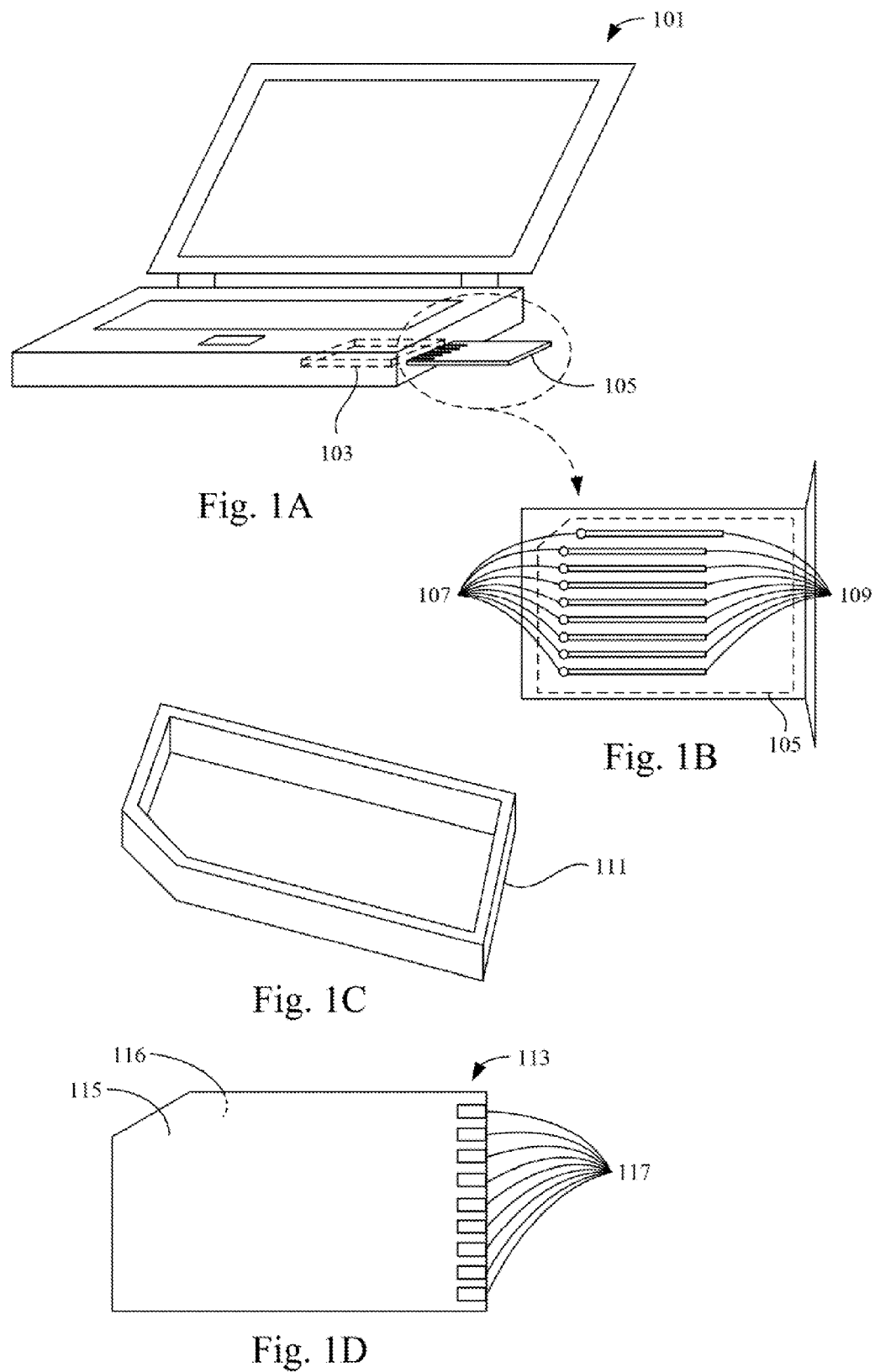
FIG. 1A is a schematic diagram of a memory card slot according to one embodiment of the present invention, in which the memory card slot is shown connected to a host computer and in a fully open state.
FIG. 1B is a top perspective view of the memory card slot according to one embodiment of the present invention.
FIG. 1C is a perspective view of a slot housing of the memory card slot according to one embodiment of the present invention.
FIG. 1D is a top view of a slot bottom of the memory card slot according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

The methods for displaying and determining a movement state of a memory card slot, and a memory card slot movement state displaying and determining system of the following embodiments use a moveable card slot to accommodate a memory card. Through use of the embodiments of the present invention, the inconvenience of manually inserting a memory card may be avoided and the service life of the memory card may be extended. In addition, heat dissipation of the memory card is also improved.

Referring to FIG. 1A to FIG. 1D, a host computer 101, such as a notebook computer, has a memory card slot 105, in which a space 103 of the host computer 101 accommodates the card slot 105. The memory card slot 105 includes a plenty of conductive contacts 107 and a fixed rotation axis (not shown) for driving the memory card slot 105. With particular reference to FIGS. 1B and 1D, a plenty of the conductive contacts 107 are disposed on a first surface 115 of a slot bottom 113 of the memory card slot 105, and a plurality of the conductive contacts 107 are disposed on a second surface 116 of the slot bottom 113 of the memory card slot 105, in which the second surface 116 is opposite to the first surface 115. A plenty of rectangular copper sheets 109 are disposed on a printed circuit board (PCB) inside the host computer 101. The rectangular copper sheets 109 electrically connect internal elements of the host computer 101 to the conductive contacts 107 of the memory card slot 105. Thus, a memory card can electrically connect to a memory card interface of the host computer 101 through the conductive contacts 107 disposed on the slot bottom 113 of the slot 105.

With particular reference to FIG. 1C and FIG. 1D, the memory card slot 105 includes the slot bottom 113 and a slot housing 111. As described above, the slot bottom 113 has a plurality of the conductive contacts 117 which are disposed on the first surface 115 thereof, and also on the second surface 116 thereof which is opposite to the first surface 115. The slot housing 111 surrounds the slot bottom 113 to form an accommodation space that accommodates the memory card.

Figure 2:
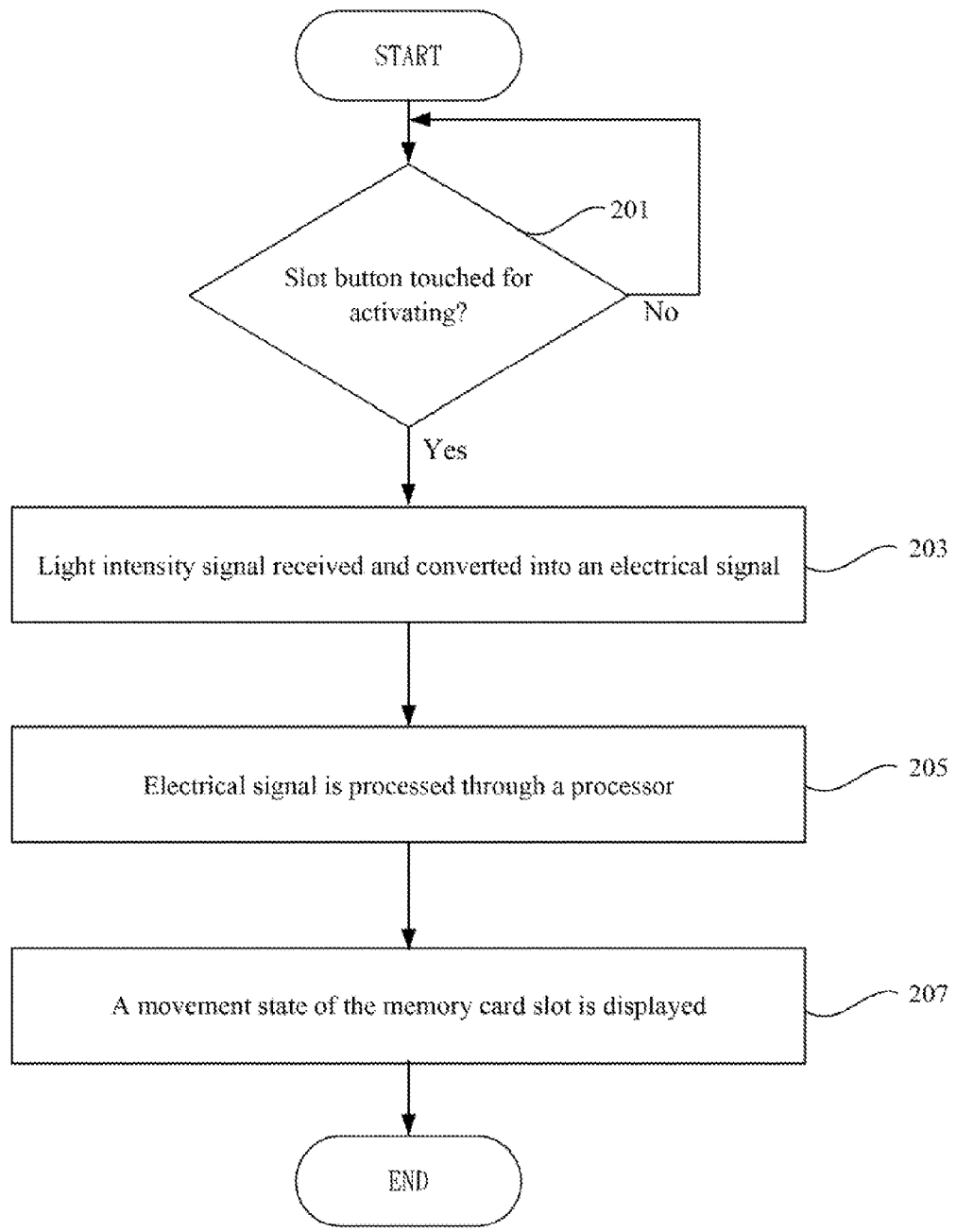
FIG. 2 is a flow chart of a method for displaying a movement state of the memory card slot according to one embodiment of the present invention.

FIG. 2 is a flow chart of a method for displaying a movement state of a memory card slot according to one embodiment of the present invention. Through a movable slot, a memory card can continue operating during a moving process, and this feature may be used to achieve heat dissipation of the memory card during operation thereof. When a card slot button is touched, a rotational axis rotates the memory card slot to move out the slot. Meanwhile, a grating sensor associated with the rotational axis obtains a light intensity signal and converts it into an electrical signal, which is then output to a processor for processing. Subsequently, corresponding processed results are displayed by a display.

In the method for displaying the movement state of a memory card slot, detection is first performed to determine whether a slot button is touched for activating (step 201). When the button has been activated, a light intensity signal is received and converted into an electrical signal (step 203). This light intensity signal represents the movement state of the memory card slot, and the light intensity signal is generated by a grating sensor through an optical grating. Moreover, the light intensity signal is converted into an electrical signal by a photovoltaic element.

Next, the electrical signal is processed by a processor to derive a position of the memory card slot (step 205), and a movement state of the memory card slot is displayed according to the position of the memory card slot (step 207). For example, the movement state of the memory card slot can be displayed by a graphical user interface provided by the display, in which the graphical user interface can indicate that the memory card slot is in a heat dissipation state, in a fully opened state, or in a fully closed state.

Furthermore, the graphical user interface can inform the user that the memory card slot is moving or in a particular operating position. For example, the graphical user interface can inform the user that the memory card slot is in a fully opened state, a fully closed state, is being moved to an open state from a closed state or from a closed state from an open state, or is at a particular position and operating at that particular position. Thus, the memory card can be easily taken out or used continually at a particular position or during movement of the memory card slot.

Figure 3:
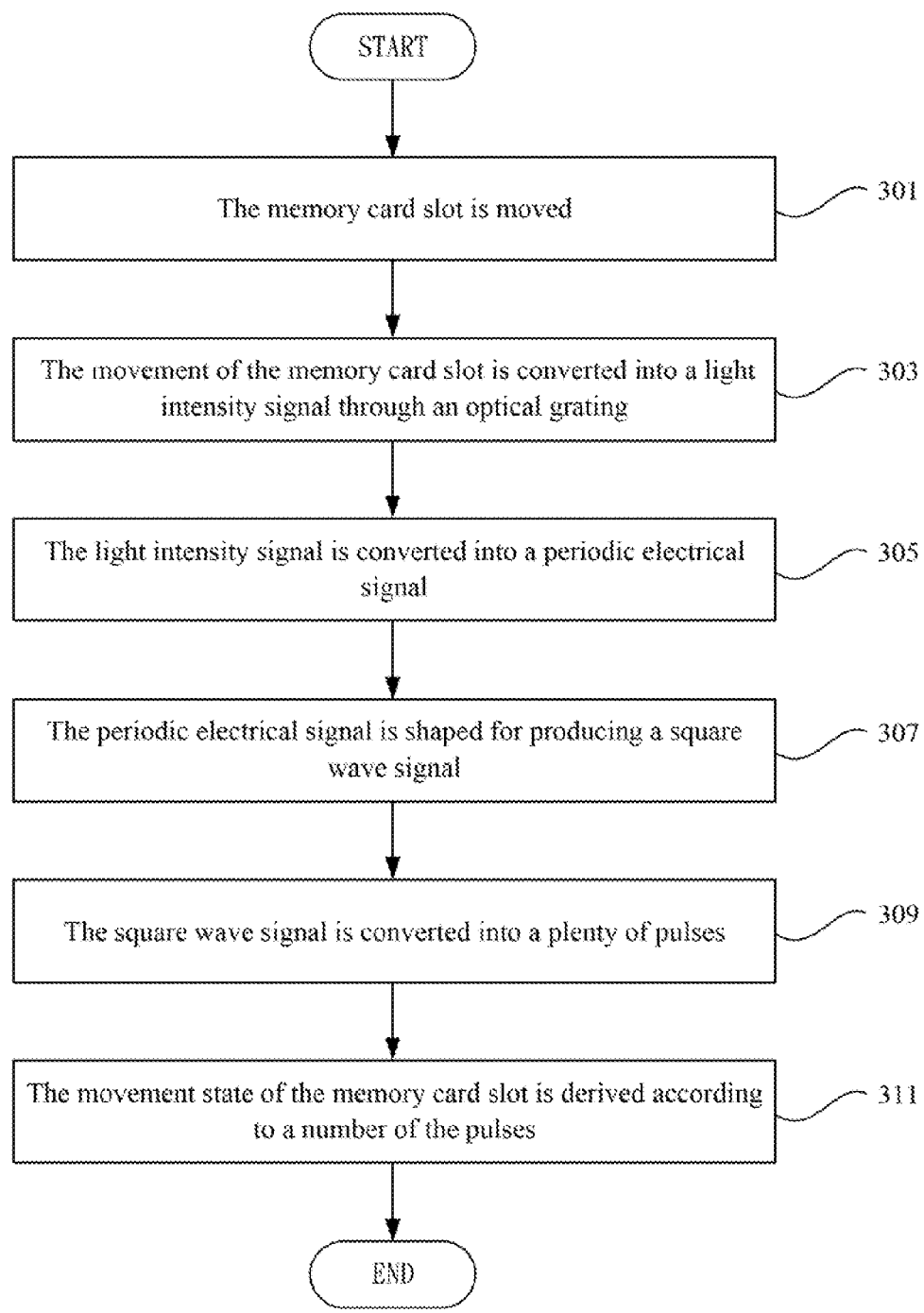
FIG. 3 is a flow chart of a method for determining a movement state of the memory card slot according to one embodiment of the present invention.

FIG. 3 is a flow chart of a method for determining a movement state of a memory card slot according to one embodiment of the present invention. In the method, the memory card slot is moved in step 301, and the movement of the memory card slot is converted into a light intensity signal through an optical grating in step 303. Next, the light intensity signal is converted into a periodic electrical signal in step 305, and the periodic electrical signal is shaped for producing a square wave signal in step 307. Subsequently, the square wave signal is converted into a plurality of pulses in step 309, and the movement state of the memory card slot is derived from the pulses in step 311.

Figure 4:
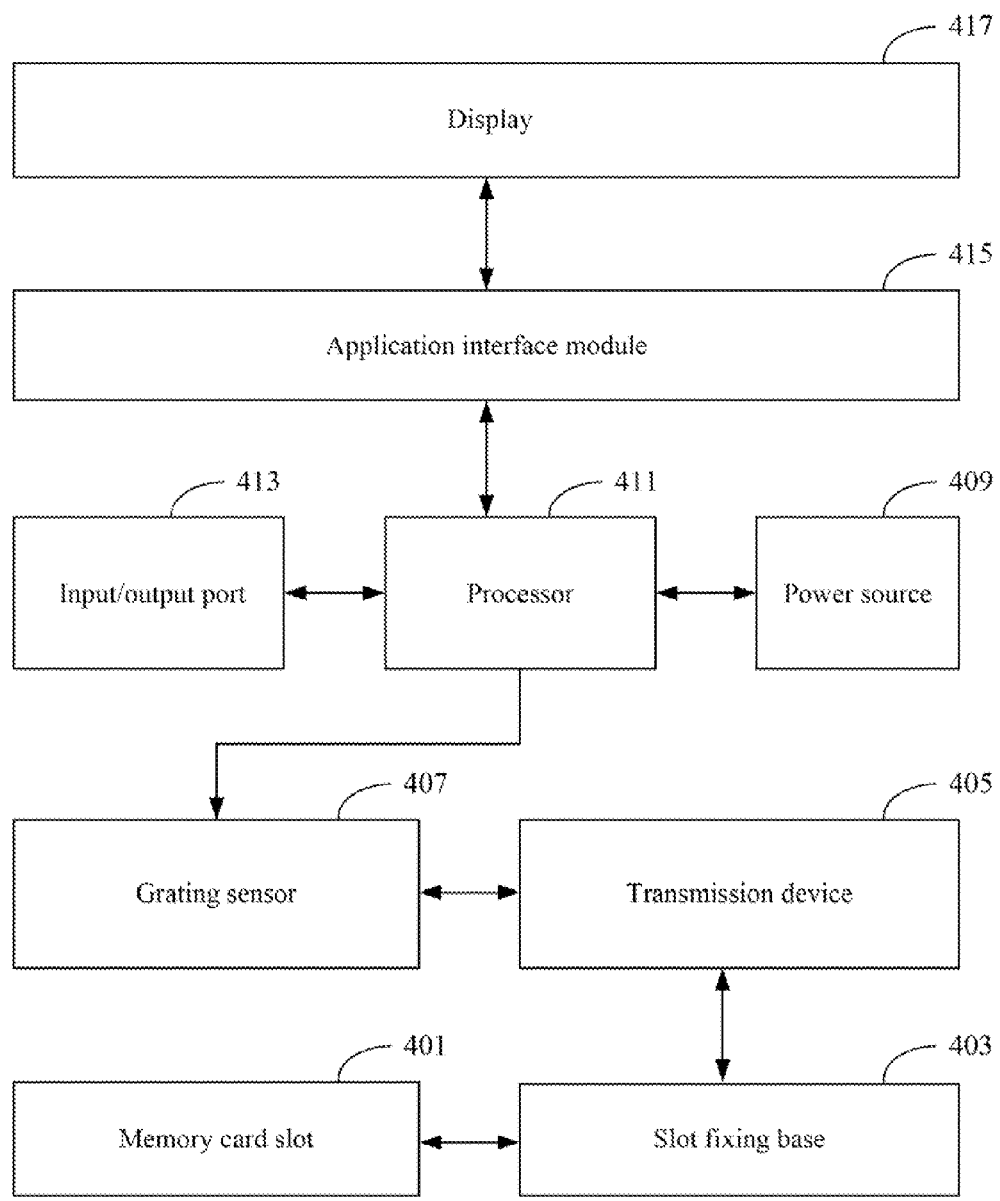
FIG. 4 is a block diagram of a memory card slot movement state displaying and determining system according to one embodiment of the present invention.

FIG. 4 is a block diagram of a memory card slot movement state displaying and determining system according to one embodiment of the present invention. The memory card slot movement state displaying and determining system includes a memory card slot 401, a slot fixing base 403, a transmission device 405, a grating sensor 407, a processor 411, and a display 417.

The memory card slot 401, which is disposed within a notebook computer, accommodates a memory card, such as an SD card. The slot fixing base 403 is connected to the memory card slot 401 for holding the memory card slot 401. The grating sensor 407 makes a light intensity signal change periodically through movement of an optical grating, in which the light intensity signal is converted into an electrical signal by a photovoltaic element. The transmission device 405 connects to and moves the slot fixing base 403, in which the grating sensor 407 communicates with the slot fixing base 403 through the transmission device 405. The processor 411 processes the electrical signal to produce a card slot position signal, and the display 417 displays a movement state of the memory card slot according to the card slot position signal.

The memory card slot movement state displaying and determining system further includes a power source 409, an input/output port 413, and an application interface module 415. The input/output port 413 connects with external peripheral devices, the power source 409 provides power for each element of the memory card slot movement state displaying and determining system, and the application interface module 415 transforms the card slot position signal generated by the processor 411 into a display signal, which enables the display 417 to show the movement state of the memory card slot through a graphical user interface.

Figure 5:
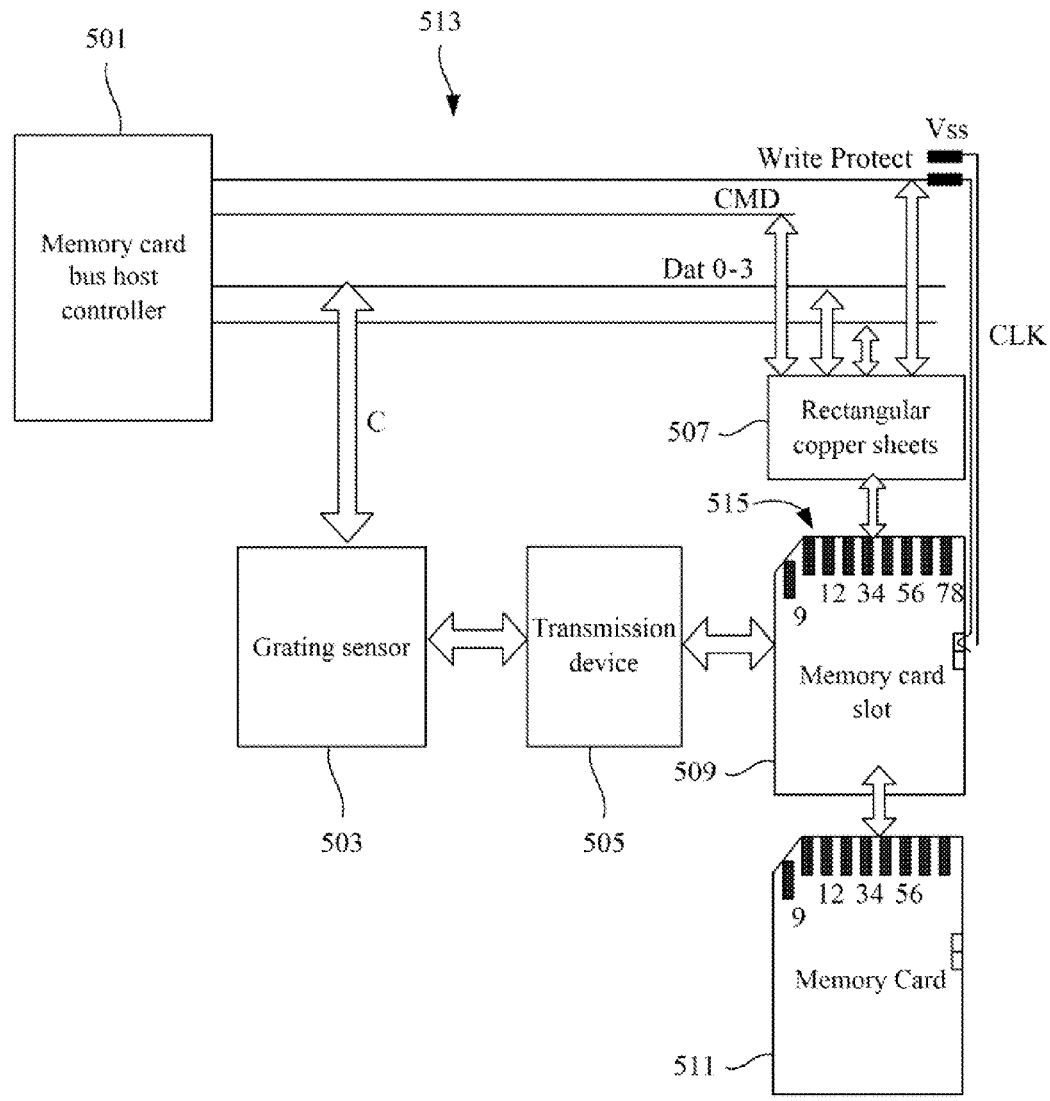
FIG. 5 is a schematic diagram of a memory card slot movement state displaying and determining system according to one embodiment of the present invention.

FIG. 5 is a schematic diagram of a memory card slot movement state displaying and determining system according to one embodiment of the present invention. The electrical connection between a memory card 511 and a computer is presented in this embodiment, which shows that the memory card 511 and the computer communicate with each other through rectangular copper sheets 507, i.e., the memory card 511 connects to the rectangular copper sheets 507 through nine conductive contacts 515 disposed on a memory card slot 509. In addition, the rectangular copper sheets 507 are fixedly connected to a memory card interface 513 of a host computer (e.g., a notebook computer), in which the memory card interface 513, which is controlled by a memory card bus host controller 501, includes a data line, a command line, a supply voltage ground line, a power line, and a clock line.

A transmission device 505, which communicates with a grating sensor 503 and the memory card slot 509, measures movement and a position of the memory card slot 509. The transmission device 505 includes a circle light barrier, and calculates the number of optical gratings being masked. A light intensity signal generated by the grating sensor 503 is converted into an electrical signal which is transmitted to a processor of the host computer through an input/output port for processing by the processor, thereby completing the invoking of the application interface function. In addition, the movement state of the memory card slot 509 is displayed.

When the transmission device 505 moves the memory card slot 509, the conductive contacts 515 slide on but maintain contact with the rectangular copper sheets 507. Therefore, the memory card 511 maintains electrical connection to the rectangular copper sheets 507 and are not disconnected therefrom, such that the memory card 511 is able to continue its reading and writing function.

Figure 6:
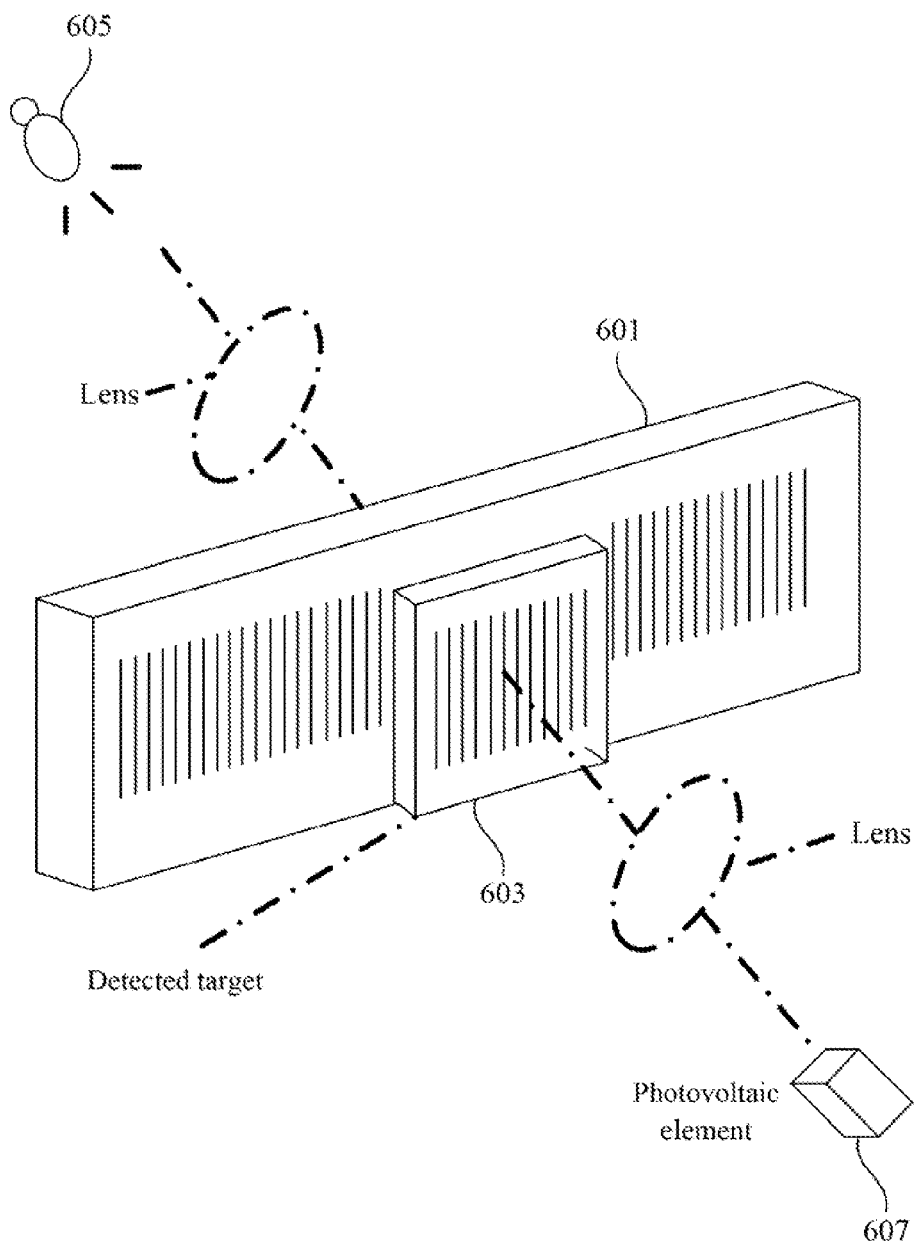
FIG. 6 is a schematic diagram of an optical grating according to one embodiment of the present invention.

FIG. 6 is a schematic diagram of an optical grating according to one embodiment of the present invention. The optical grating 601 is a transparent optical glass that includes a plurality of score lines of equal width. When a detected target 603 illuminated by a light source 605 moves on the optical grating 601, a light intensity signal is generated and is converted to an electrical signal through a photovoltaic element 607. Subsequently, a processor determines and detects a state of the detected target 603 based on the electrical signal.

Figure 7A:
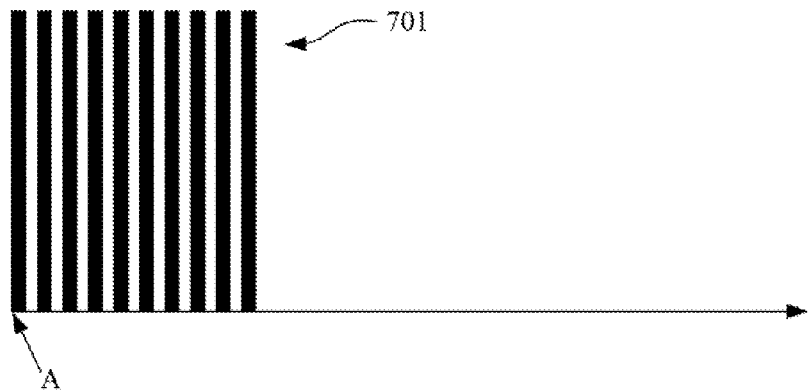
FIG. 7A and FIG. 7B are schematic diagrams used to describe moving distance measurement of the memory card slot according to one embodiment of the present invention.
Figure 7B:
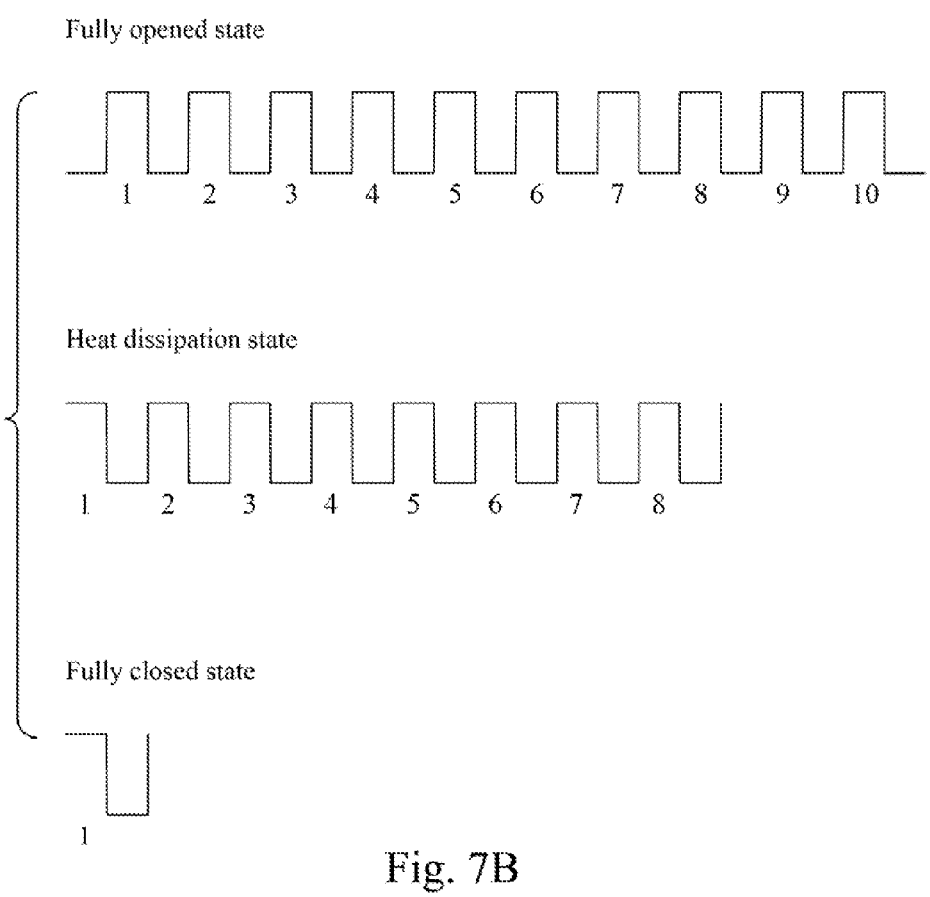

FIG. 7A and FIG. 7B are schematic diagrams used to describe moving distance measurement of a memory card slot according to one embodiment of the present invention. The moving distance of a memory card slot is measured through an optical grating 701, in which the length of the optical grating 701 composed of interleaved bright and dark lines is L. In this embodiment, the number of the dark lines of the optical grating 701 is ten, and point A is an initial starting location of the score lines. The movement amount of the memory card slot is the optical grating distance multiplied by a number of pulses. FIG. 7B shows the relationship between the light pulses and the movement of the memory card slot. The memory card slot is in a fully opened state if there are ten successive light pulses. The memory card slot is in a heat dissipation state if there are eight successive light pulses. The memory card slot is in a fully closed state if there is only one light pulse.

Figure 8A:
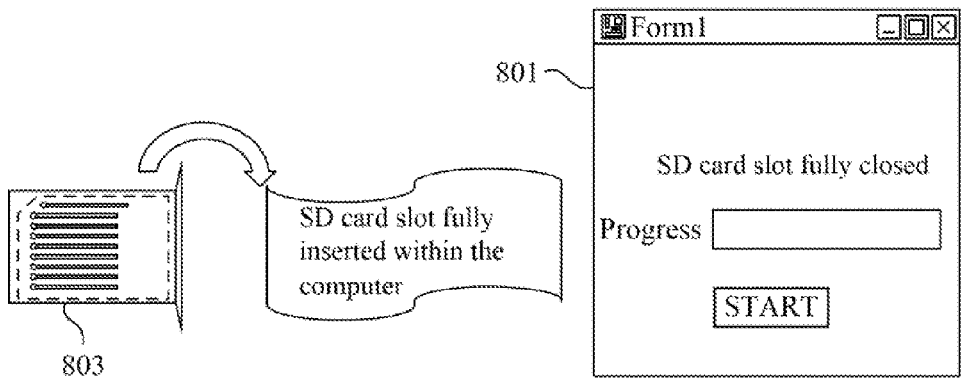
FIG. 8A, FIG. 8B, and FIG. 8C are schematic diagrams of a graphical user interface according to one embodiment of the present invention.
Figure 8B:
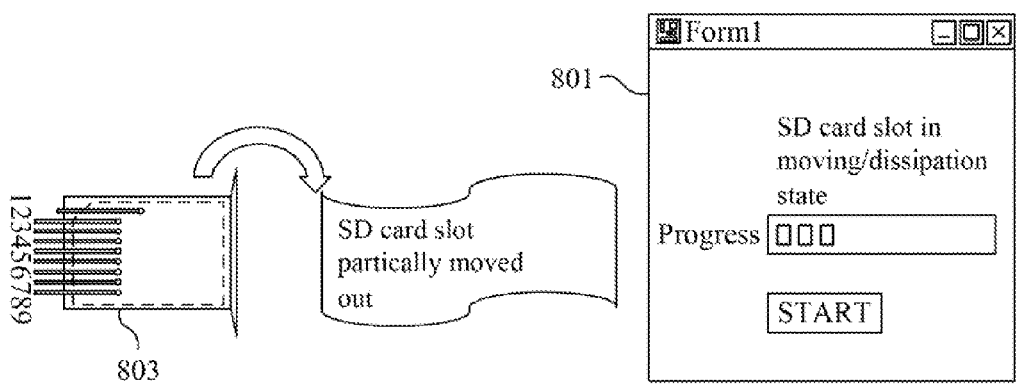
Figure 8C:
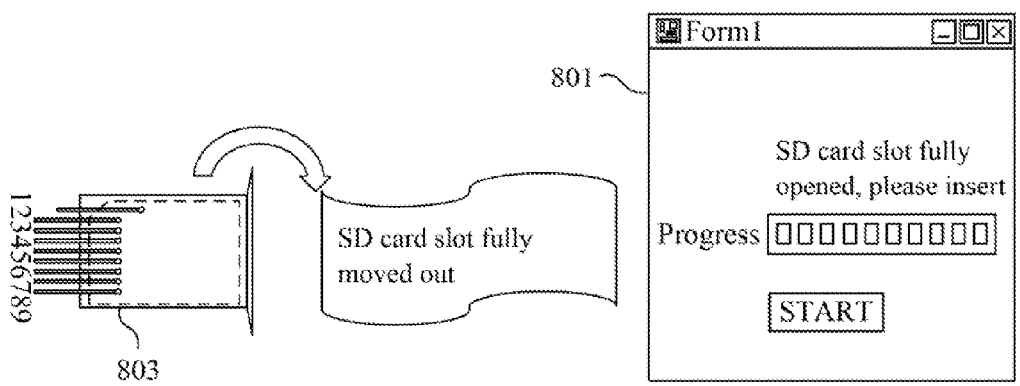

FIG. 8A, FIG. 8B, and FIG. 8C are schematic diagrams of a graphical user interface according to one embodiment of the present invention. In this embodiment, a memory card disposed within a card slot 803 for normal operation, and it is not necessary to manually plug in and remove the memory card, thereby overcoming the problem of button displacement. The card slot 803 can be used as a storage space when the memory card is not employed. The graphical user interface 801 informs the user whether the card slot is fully closed, i.e., whether the memory card slot 803 is in a closed state, as shown in 8A.

In FIG. 8B, the card slot 803 is indicated as moving and operating, that is, is being inserted. At this time, the graphical user interface 801 displays the movement state or its position, that is, the card slot 803 in the process of being inserted or moved to a certain position and operating. Because the memory card can operate while moving, the problem of heat dissipation due to use of the memory card for long periods may be resolved. The graphical user interface 801 can further display the memory card slot distance or the moving distance.

In FIG. 8C, the graphical user interface 801 informs the user that the card slot 803 has been fully moved out, i.e., is in a moved out state. In this state, the memory card may be removed from the card slot 803 or may continue to operate.

The methods for displaying and determining the movement state of the memory card slot, and the memory card slot movement state displaying and determining system of the above embodiments use a moveable card slot to accommodate the memory card. The memory card may be operated immediately after being placed within the card slot, eliminating the inconvenience of having to manually insert the memory card and extending the service life of the memory card. In addition, the heat dissipation effect of the memory card is also improved.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for displaying a movement state of a memory card slot, the method comprising:
   detecting whether the memory card slot is moved;
   receiving and transforming, by a photovoltaic element, a light intensity signal into an electrical signal when the memory card slot is moved, wherein the light intensity signal represents the movement of the memory card slot;
   processing the electrical signal through a processor for deriving a position of the memory card slot; and
   displaying the movement state according to the position of the memory card slot.

2. The method as claimed in claim 1, wherein the light intensity signal is generated by a grating sensor through movement of an optical grating.

3. The method as claimed in claim 1, wherein the movement state of the memory card slot is displayed on a display through a graphical user interface provided by the display.

4. The method as claimed in claim 3, wherein the graphical user interface displays the memory card slot in a heat dissipation state, in a fully opened state, or in a fully closed state.

5. The method as claimed in claim 1, wherein the movement state of the memory card slot is displayed on a display through a graphical user interface provided by the display.

6. The method as claimed in claim 5, wherein the graphical user interface displays the memory card slot in a heat dissipation state, in a fully opened state, or in a fully closed state.

7. A method for determining a movement state of a memory card slot, the method comprising:
   moving the memory card slot;
   converting the movement of the memory card slot into a light intensity signal through a grating;
   converting the light intensity signal into a periodic electrical signal;
   shaping the periodic electrical signal for producing a square wave signal;
   converting the square wave signal into a plurality of pulses; and
   deriving the movement state of the memory card slot according to a number of the pulses.

8. A memory card slot movement state displaying and determining system, comprising:
   a memory card slot for accommodating a memory card;
   a slot fixing base connected to the memory card slot for holding the memory card slot;
   a grating sensor for making a light intensity signal change periodically through a movement of an optical grating, wherein the light intensity signal is converted into an electrical signal by a photovoltaic element;

a transmission device for connecting to and moving the slot fixing base, wherein the grating sensor communicates with the slot fixing base through the transmission device;

a processor for processing the electrical signal to produce a card slot position signal; and a display for displaying a movement state of the memory card slot according to the card slot position signal.

9. The memory card slot movement state displaying and determining system as claimed in claim 8, further comprising:

an application interface module for transforming the card slot position signal generated by the processor into a display signal and for showing the movement state of the memory card slot on the display.

10. The memory card slot movement state displaying and determining system as claimed in claim 9, wherein the memory card slot is used for accommodating a secure digital memory card.

11. The memory card slot movement state displaying and determining system as claimed in claim 10, wherein the optical grating is an optical glass having a plurality of score lines of equal width.

12. The memory card slot movement state displaying and determining system as claimed in claim 11, wherein the display shows the movement state of the memory card slot through a graphical user interface.

13. The memory card slot movement state displaying and determining system as claimed in claim 9, wherein the memory card slot comprises:

a slot bottom having a first surface and a second surface opposite to the first surface, wherein a plurality of conductive contacts are disposed on the first surface and the second surface of the slot bottom; and a slot housing which surrounds the slot bottom and forms an accommodation space.

14. The memory card slot movement state displaying and determining system as claimed in claim 13, wherein the memory card is electrically connected to a memory card interface of a computer through the conductive contacts of the slot bottom.

15. The memory card slot movement state displaying and determining system as claimed in claim 13, wherein the optical grating is an optical glass having a plurality of score lines of equal width.

16. The memory card slot movement state displaying and determining system as claimed in claim 15, wherein the display shows the movement state of the memory card slot through a graphical user interface.

17. The memory card slot movement state displaying and determining system as claimed in claim 16, wherein the memory card slot is disposed on a notebook computer.

18. The memory card slot movement state displaying and determining system as claimed in claim 9, wherein the optical grating is an optical glass having a plurality of score lines of equal width.

19. The memory card slot movement state displaying and determining system as claimed in claim 9, wherein the display shows the movement state of the memory card slot through a graphical user interface.

20. The memory card slot movement state displaying and determining system as claimed in claim 9, wherein the memory card slot is disposed on a notebook computer.

* * * * *